Figure 1A:
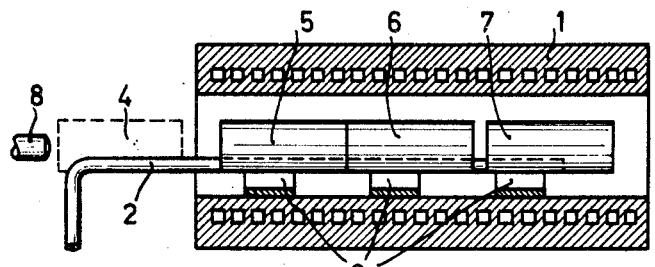

Aug. 28, 1962  H. KOESLING  3,051,811
DEVICE FOR HEATING WORKPIECES INDUCTIVELY
Filed Aug. 24, 1959   2 Sheets-Sheet 1

INVENTOR
*HEINZ KOESLING*
BY
AGENT

Aug. 28, 1962          H. KOESLING          3,051,811
DEVICE FOR HEATING WORKPIECES INDUCTIVELY
Filed Aug. 24, 1959          2 Sheets-Sheet 2

INVENTOR
*HEINZ KOESLING*

BY

AGENT

United States Patent Office 3,051,811
Patented Aug. 28, 1962

3,051,811
DEVICE FOR HEATING WORKPIECES
INDUCTIVELY
Heinz Koesling, Reichenbach Fils, Germany, assignor to North American Philips Company, Inc., New York, N.Y., a corporation of Delaware
Filed Aug. 24, 1959, Ser. No. 835,800
Claims priority, application Germany Aug. 23, 1958
5 Claims. (Cl. 219—10.67)

The present invention relates to devices for heating, by induction, workpieces which are supplied at one end of an inductor accommodating a plurality of workpieces which, when introducing a fresh workpiece, are moved on by the latter over a guide, the workpiece heated to the desired temperature each time leaving the inductor at its other end simultaneously or shortly before. Such induction-heating devices, which are in general termed "throughput" heaters, are known per se. They have a serious limitation in that, in the case of a high throughput and in particular at elevated temperatures, the workpieces weld together at their contact surfaces This disadvantage is due to the fact that the inductor contains several workpieces during operation and the workpieces have to be pushed through the inductor from its input end onwards. On passing over their guide, in particular at the output end of the inductor, they are subject to considerable friction which is still increased by the high temperature of the workpieces in situ. Overcoming this friction requires a considerable effort due to which the compressed ends of the last workpieces having a high temperature weld together. Hence, the conventional inductive throughput heaters should comprise an additional stage in which the workpieces adhering comparatively firmly together are separated from each other.

The present invention has for its object to obviate these disadvantages of conventional throughput heaters. For this purpose, in a device of the type set out hereinafter, the inductor comprises a device creating, immediately after pushing in a new workpiece, a little clearance between the last workpiece then located before the output end of the inductor and the preceding workpiece. By this expedient, the aforesaid disadvantage is avoided since only the last two workpieces in the inductor have a temperature causing these workpieces to weld together at the pressure to be exerted on the series of workpieces.

Preferably, the withdrawing device removing the last workpiece from the inductor after reaching the desired temperature serves as a device for creating a gap clearance between the last and the preceding workpiece. Such withdrawing devices are known per se and have been used for removing, in throughput heaters, the workpiece heated to the required temperature from the inductor without removing the next succeeding workpiece entirely or partially from the field of force. Such a known withdrawing device may, as explained, serve to avoid welding together of the workpieces when used in the manner referred to.

In a further suitable embodiment of the invention, the guide inside the inductor is divided between the penultimate and last workpiece, and the guide portion located at the input end is movable over a short distance in a longitudinal direction so that, after inserting a new workpiece, it can be withdrawn over a distance corresponding to the desired width of the gap together with the workpieces resting on it. This permits withdrawing means for the hot workpiece to be omitted. After inserting a new workpiece by means of a push-in device, the workpieces are moved through the inductor until the workpiece heated to its final temperature leaves the inductor and finds its way on a declivity or other conveying means for further treatment. When the guide portion at the input end together with the workpieces resting on it is moved back a few millimeters, the desired gap results between the last and the penultimate workpiece so as to permit the last workpiece to be heated to the desired temperature without fear of the workpieces welding together.

The guide portion at the input end may be constructed so as to be movable in the direction of conveyance against the force of a spring. After displacement in a longitudinal direction, it is thus caused to resume its rest position together with the workpieces resting on it. It will be evident that this construction of the guide portion permits partial automation in conveying the workpieces, it being necessary only to push in the workpieces, while the desired gap between the last two workpieces forms automatically.

If the throughput heater according to the invention is required to have a particularly high hourly throughput of comparatively short workpieces a plurality of inductors may be arranged in juxtaposition in a further embodiment of the invention. These inductors are alternately charged and discharged and for all the inductors a single one push-in device and, as the case may be, a single device for withdrawing the workpieces and forming a gap may be provided, which devices are each time moved in front of the inductor from which a workpiece is to be withdrawn or to which a fresh workpiece is to be supplied. This step is of importance since only when in an inductor a comparatively small number of workpieces are treated will the temperatures of the individual succeeding workpieces have a sufficient temperature difference. If, for example, an inductor contains six, ten or more workpieces the temperature difference is small so that not only the last workpiece and the penultimate workpiece are to be prevented from welding together, but also further preceding workpieces. Therefore, a high throughput per hour is not easily obtainable with inductors having a considerable length. The invention, by which such welding together is prevented, may also be used in the case of a high throughput per hour by operating a plurality of juxtaposed inductors in the aforesaid manner.

The withdrawing device by means of which the heated workpieces are removed from the inductor and, according to the invention, the gap between the last workpiece and penultimate workpiece is formed may be constituted by tongs, rocker arms, lifting slides or the like.

Figure 1B:
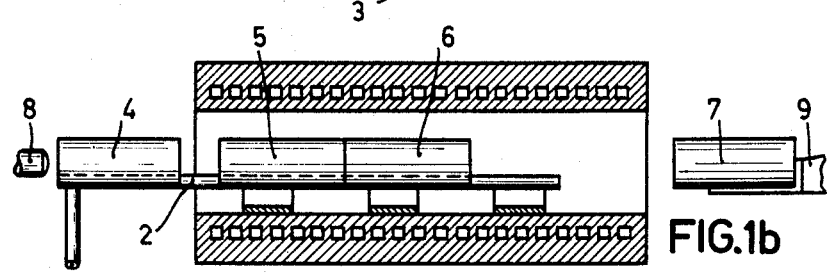
Figure 1C:
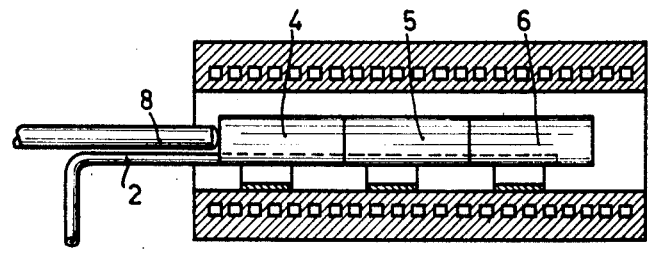
Figure 1D:
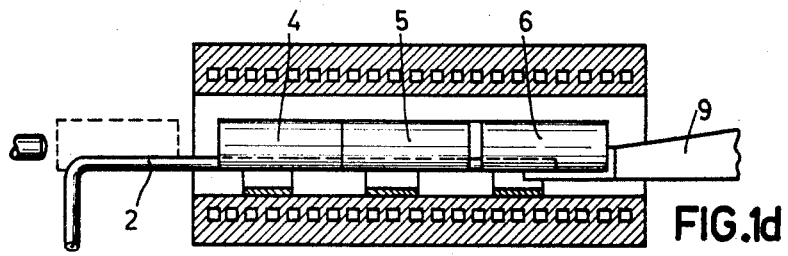
Figure 2:
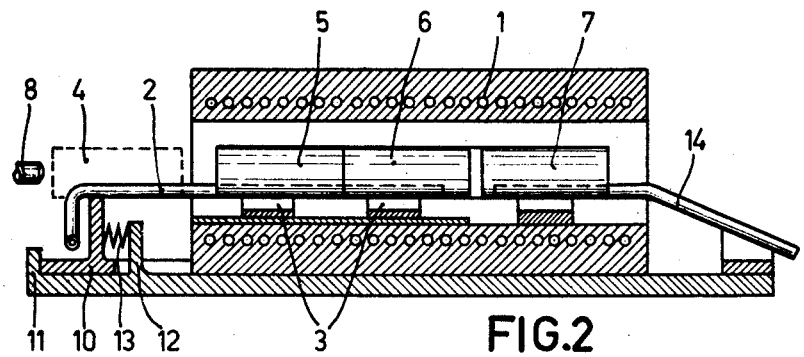
Figure 3:
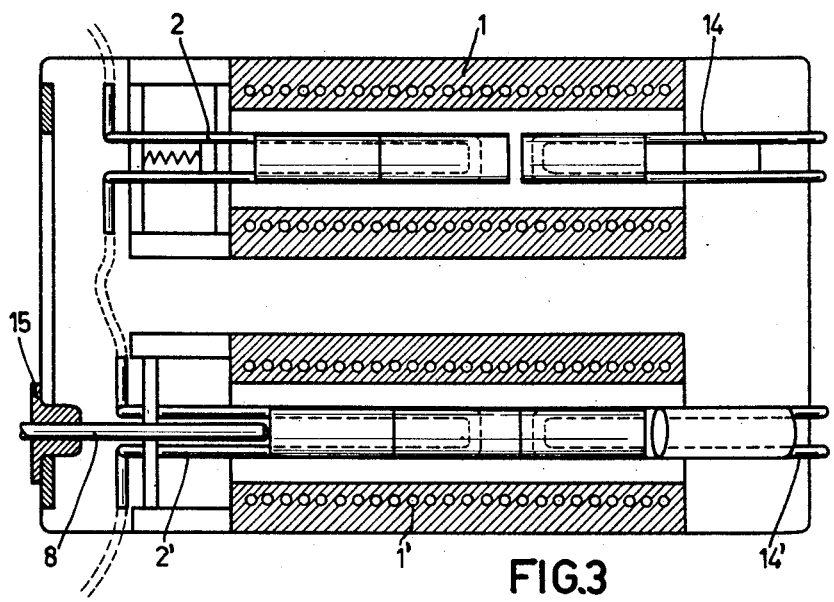

In order that the invention may be readily carried into effect, examples will now be described in detail with reference to the accompanying diagrammatic drawings, in which FIGS. 1a to 1d represent an inductive throughput heater, in which the gap between the last workpiece and the penultimate workpiece is formed by means of a withdrawing device, FIG. 2 shows a throughput heater with divided guide, FIG. 3 shows a device comprising two inductors permitting a higher throughput per hour.

FIGS. 1a to 1d represent the same throughput heater, in which the individual operations for conveying the workpieces through the inductor and forming the gap between the last workpiece and the penultimate workpiece are shown in their separate phases relative to each other. The space of the inductor 1 contains a guide 2 consisting of two parallel water-cooled metal tubes which carry the workpieces and are stationary relative to the inductor. The tubes are secured in a suitable manner inside the inductor, in the present example by means of thin metal supports 3. The workpieces are fed to the inductor 1 from the left, pass through the inductor from left to right so that they are gradually heated to the desired temperature and leave the inductor at its right-hand end. A workpiece to be introduced is designated by 4 in FIG. 1a, while the workpieces 5, 6 and 7 have entered the inductor. A push member 8 urges the workpiece 4 into the inductor.

Let it be assumed that the workpiece 4 has not yet been placed on the guide 2, while the workpiece 7 has reached its final temperature. The hot workpiece is removed by means of a withdrawing device 9 and the workpiece 4 is placed on the guide as illustrated in FIG. 1b. By means of a push member 8 the workpiece 4 is urged to the right and moves the workpieces 5 and 6 in front of it to the position shown in FIG. 1c. Immediately after that the workpiece 6, which has reached a high but not yet its final temperature, is slightly moved to the right by means of the withdrawing device 9, thus forming between the workpieces 5 and 6 a gap preventing these two workpieces from welding together. This is shown in FIG. 1d. Any formation of the gap, the withdrawing device is removed from the inductor wihtout, however, entraining the workpiece 6. Thus the situation shown in FIG. 1a is reached and the further treatement of the workpieces occurs in the manner set out before.

FIG. 2 shows a further example of a device according to the invention. In this case, th eguide 2 is divided so that its stationary part 14 is at the right-hand end of the inductor. This stationary part is sharply bent downwards where it leaves the inductor so that a workpiece finding its way on this inclined portion of the guide slides down by gravity. The left-hand portion of the guide shown at the left in this figure is movable in the direction of the axis of the inductor. For this purpose, the end of the guide protruding from the inductor rests on a slide 10, while its supporting member 3 is also slidable inside the inductor. The guide portion 2 is consequently movable in an axial direction and its movement is limited by stops 11 and 12. A compression spring 13 tends to draw the guide portion 2 out of the inductor 1.

When placing a workpiece 4 on the guide portion 2 and moving it to the right by means of the push member 8, the workpieces 5 and 6 inside the inductor move into engagement with the workpiece 7, the guide portion 2, which is movable in a longitudinal direction, being entrained by friction until it abuts. During the further feed the hot workpiece 7 finds its way on the inclined portion 14 of the guide from which it slides down for further treatment. Due to its short duration, however, the pressure exerted on the hot workpiece 7 is unable to weld this workpiece to the workpiece 6. On retraction the push member 8, after the workpiece 6 has assumed the position of the workpiece 7 in FIG. 2, the spring 13 urges the guide portion 2 to the left and this guide portion entrains the workpieces 4, 5 along. In this manner, the required gap between the last workpiece and the penultimate workpiece is formed automatically and the workpieces inside the inductor can be further heated until the last workpiece reaches the desired temperature, subsequently to which the ejecting and introducing operations with the formation of a gap are repeated.

As set out before, an increase of the hourly throughput by lengthening the inductor is unfeasible if the advantages resulting from the invention are to be conserved. A device for inductive heating permitting a higher throughput per hour is shown in FIG. 3. In this case, two inductors 1, 1' are juxtaposed and alternately charged with workpieces. The overall device is shown in vertical projection in FIG. 3. In this device, the guide is divided similarly as in FIG. 2 and made up of guide portions 2 and 2' respectively movable in a longitudinal direction and stationary guide portions 14 and 14' respectively bent downwardly at the right-hand end. The push-in member 8 is common to the two inductors and movable transversely of the inductors on a slide 15. The push member 8 is each time moved in front of the inductor the last workpiece of which has reached the desired temperature, so that a new workpiece is in position to be fed. The operation of the two inductors with their guides and the method of forming the required gap between the last workpiece and the penultimate workpiece are the same for the two inductors. Further explanation appears to be superfluous after what has been said with reference to FIG. 2. Since the two inductors 1 and 1' are alternately charged with new workpieces and the hot workpieces are alternately removed from them at the right-hand end, the throughput is doubled relatively to a single induction-heating device as shown in FIG. 2. FIG. 3 is given only by way of example and it will be appreciated that alternatively more than two juxtaposed inductors are operable in the aforesaid manner.

What is claimed is:

1. An inductive heating device for workpieces being supplied at one end of a tunnel-type inductor and moved rectilinearly therethrough comprising a guide for said workpieces through said inductor, each workpiece being heated to the desired temperature and leaving the inductor at the other end thereof, and means for slightly spacing said workpiece at the other end from the preceding workpiece in said inductor when said workpiece attains a high but not the desired temperature and for withdrawing the former from the inductor without adherence of the two workpieces when the desired temperature is reached.

2. An inductive heating device for workpieces being supplied at one end of a tunnel-type inductor and moved rectilinearly therethrough comprising a two-part guide for said workpieces through said inductors, one part of said guide being stationary and receiving the workpiece adjacent to the other end of said inductor and permitting said workpiece to be removed from the inductor, the other part of said guide being mounted for limited rectilinear movement supporting all the workpieces except the workpiece on said stationary part of said guide, said movable part of the guide after introducing a new workpiece to said inductor pushing the extreme right-hand workpiece on said stationary part of the guide, and withdrawing said movable part of the guide a distance to form a gap between said extreme right-hand workpiece and the adjacent workpiece.

3. An inductive heating device for workpieces as claimed in claim 1 wherein said means is a withdrawing device which initially moves said workpiece at the other end of the inductor to form a gap between the latter and the adjacent workpiece and thereafter removes the workpiece at the other end of the inductor from the inductor when the same reaches its final temperature.

4. An inductive heating device for workpieces being supplied at one end of a tunnel-type inductor and moved rectilinearly therethrough comprising a two-part guide for said workpieces through said inductors, one part of said guide being stationary and receiving the workpiece adjacent to the other end of said inductor and permitting said workpiece to be removed from the inductor, the other part of said guide being mounted for limited rectilinear movement supporting all the workpieces except the workpiece on said stationary part of said guide, a push member, a spring biasing said movable part of said guide out of said inductor whereby when said movable part is moved by said push member into said inductor against spring pressure said movable part together with the workpieces thereon are moved back to a limited degree by said spring when the force of said push member is removed, said movable part of the guide after introducing a new workpiece to said inductor pushing the extreme right-hand workpiece on said stationary part of the guide, and withdrawing said movable part of the guide a distance to form a gap between said extreme right-hand workpiece and the adjacent workpiece.

5. An inductive heating device for workpieces being supplied at one end of a plurality of tunnel-type inductors and moved rectilinearly therethrough, said inductors being alternately charged and discharged comprising a guide for said workpieces through each inductor, a single push member for all of said inductors, each workpiece being heated to the desired temperature and leaving the inductor at the other end thereof, and means for slightly spacing said workpiece at the other end of each inductor from the preceding workpiece in said inductor and for withdrawing the former from the inductor without adherence of the two workpieces.

References Cited in the file of this patent
UNITED STATES PATENTS

| | | |
|---|---|---|
| 1,697,811 | Dailey | Jan. 1, 1929 |
| 1,868,954 | Sorrel et al. | July 26, 1932 |
| 1,922,888 | Engelbertz | Aug. 15, 1933 |
| 2,052,380 | Chapman | Aug. 25, 1936 |
| 2,819,370 | Osborn | Jan. 7, 1958 |